US008811226B2

(12) United States Patent
Buob et al.

(10) Patent No.: US 8,811,226 B2
(45) Date of Patent: Aug. 19, 2014

(54) MANAGEMENT OF ROUTING TOPOLOGY IN A NETWORK

(75) Inventors: Marc-Olivier Buob, Issy les Moulineaux (FR); Anthony Lambert, Reze (FR)

(73) Assignee: Orange, Paris (FR)

( * ) Notice: Subject to any disclaimer, the term of this patent is extended or adjusted under 35 U.S.C. 154(b) by 227 days.

(21) Appl. No.: 13/060,089

(22) PCT Filed: Aug. 24, 2009

(86) PCT No.: PCT/FR2009/051619
§ 371 (c)(1), (2), (4) Date: Feb. 22, 2011

(87) PCT Pub. No.: WO2010/023400
PCT Pub. Date: Mar. 4, 2010

(65) Prior Publication Data
US 2011/0170448 A1   Jul. 14, 2011

(30) Foreign Application Priority Data
Aug. 29, 2008 (FR) ..................... 08 55831

(51) Int. Cl.
*G01R 31/08* (2006.01)
*H04L 12/28* (2006.01)

(52) U.S. Cl.
USPC ............................ 370/254; 370/351; 370/218

(58) Field of Classification Search
CPC ............................. G01R 31/08; H04L 12/28
USPC ......... 370/216, 218, 220, 219, 217, 230, 231, 370/232, 235, 236, 254, 252, 253, 255, 400, 370/389, 351
See application file for complete search history.

(56) References Cited

U.S. PATENT DOCUMENTS

| 7,313,419 B2* | 12/2007 | Islam et al. ............ 455/574 |
| 7,362,709 B1* | 4/2008 | Hui et al. ............ 370/237 |
| 2003/0179742 A1* | 9/2003 | Ogier et al. ............ 370/351 |
| 2005/0180438 A1* | 8/2005 | Ko et al. ............ 370/401 |
| 2005/0195835 A1* | 9/2005 | Savage et al. ............ 370/401 |

FOREIGN PATENT DOCUMENTS

| EP | 1 473 890 A2 | 11/2004 |
| WO | WO 02/46949 A1 | 6/2002 |

OTHER PUBLICATIONS

Callon, "Use of OSI IS-IS for Routing in TCP/IP and Dual Environments; RFC 1195," pp. 1-85 (Dec. 1990).
Chandra et al., "BGP Communities Attribute; RFC 1997," pp. 1-5 (Aug. 1996).
Moy, "OSPF Version 2; RFC 2328," pp. 1-244 (Apr. 1998).
Rekhter et al., "A Border Gateway Protocol 4 (BGP-4); RFC 4271," pp. 1-104 (Jan. 2006).

* cited by examiner

*Primary Examiner* — Hanh N Nguyen
(74) *Attorney, Agent, or Firm* — Drinker Biddle & Reath LLP

(57) ABSTRACT

In a packet communication network comprising a plurality of nodes connected by respective links according to a routing topology, ordered metrics are respectively associated with links each connecting two nodes together directly. On detection of a modification of the routing topology, at the level of a first node connected by a link to at least one second node, a timer value associated with the second node is determined. Next, the timer is set. Finally, on expiring of this timer, a topology update message is emitted destined for the second node. The timer value is provided by an increasing function taking as parameter the metric associated with said link connecting the first node to the second node, so that the larger the metric, the larger the timer value.

16 Claims, 3 Drawing Sheets

MANAGEMENT OF ROUTING TOPOLOGY IN A NETWORK

CROSS-REFERENCE TO RELATED APPLICATIONS

This application is the U.S. national phase of the International Patent Application No. PCT/FR2009/051619 filed Aug. 24, 2009, which claims the benefit of French Application No. 08 55831 filed Aug. 29, 2008, the entire content of which is incorporated herein by reference.

BACKGROUND

The present invention relates to the field of telecommunications, and more particularly the routing protocols and network elements that implement such protocols.

A conventional telecommunication network comprises network elements, called routers, the function of which is to optimize the transmission of the packets. In practice, the transmission of a packet from one element to another element in the network can generally be performed along several paths. The routers make it possible to optimize such a transmission by selecting the best transmission path from the possible transmission paths based on certain performance criteria. Such criteria may, for example, correspond to the shortest path in terms of number of hops between two routers, or even the path that maximizes an economic benefit for the operation of the network concerned. A router thus selects a transmission path on the basis of information generally received according to a routing protocol and stored in routing tables.

A routing protocol is a protocol which provides a router with the mechanisms enabling a router to construct such a routing table and to share the routing information with other routers with which it maintains a session according to the routing protocol. There are several types of routing protocols that use different methods to assist the router in collecting routing information and make it possible to determine a routing topology indicating the best routing paths in the network, in light of certain criteria, to reach a given resource from a given router.

The routing topology of a network can be modified, notably when a network router fails. In this case, one or more best routing paths may disappear and other "best paths" are then once again determined according to the routing protocol implemented in the network concerned. The time period during which new best paths are determined corresponds to the "routing protocol convergence" period.

The performance of such a transmission network is strongly dependent on the speed with which the routing topology can converge. In practice, the faster the convergence of the routing topology, the faster the packets are routed over the best paths of the network. Furthermore, during the convergence period of the routing topology, numerous packets may be lost.

FIG. 1 illustrates such a network of routers, comprising five routers N1 to N5, the routers N1, N2 and N5 respectively having resources R1, R2 and R3. In the present context, a resource may be a destination in the network, like an IP address or a set of IP addresses (for example, an IP prefix).

In this context, each router Nj, for j between 1 and 5, selects a best path to contact each resource R1, R2 and R3. In this network, depending on the routing protocol used, the routers Nj exchange information on their capacity to contact the various resources Ri, for i between 1 and 3. The implementation of a routing protocol allows for the exchange of routing information between the various routers so as to update the respective routing tables and thus save the "best" paths.

The routing table of each router indicates the respective best paths for contacting the resources of the network, and all the best paths make up the routing topology of the network. If, upon receipt of update messages from other routers, a new best path is determined to contact a given resource, then this router modifies its routing table and informs the neighboring routers thereof, that is to say, the routers that are linked to it by a direct link according to the routing topology. The term "direct link" should be understood to mean a link that links two routers directly with no other intermediate router.

Then, when a router has determined all its best paths to the various resources of the network, it stops modifying its routing table and therefore sending new update messages according to the routing protocol. The router has then converged in the sense of the routing protocol.

When the routing topology of the network is in a stable state, no update message according to the routing protocol is sent. On convergence of the routing protocol, the best paths between the various routers are illustrated by arrowed lines in FIG. 1.

FIG. 2 complements FIG. 1 by illustrating, in tree form, the best paths for contacting the resources of the network from the routers. Thus, the tree of best paths for contacting the resource R3 is illustrated in a part 31, the tree of best paths for contacting the resource R2 is illustrated in a part 32, and the tree of best paths for contacting the resource R1 is illustrated in a part 33. Here, the criterion used to select the best path corresponds in fact to the shortest path in terms of number of hops.

It should be noted that, for a given resource Ri, the convergence time of the routing protocol, and the number of messages exchanged according to this protocol between the various routers of the network, and the number of transient states through which the network passes during the convergence of the routing protocol, are very strongly linked to the order in which the nodes of the network receive their messages. In practice, the ideal case corresponds to the case in which the first path learned by a router is its best path. In this case, the routing protocol converges rapidly. The worst case corresponds to the case where each router learns, in reverse order of its preferences, the various possible paths for contacting the resource concerned, that is to say, in reverse order of the paths that will be the best paths for it.

As it happens, the performance levels of a network depend on the speed of convergence of the routing protocol used in this network and on the number of messages exchanged according to this protocol between the various routers of the network.

A document entitled "Differentiated BGP update processing for improved routing convergence" by W. Sun, Z. M. Mao and K. G. Shin, May 2006, describes a method of managing exchanges of messages according to the BGP routing protocol.

The management method described here aims, in the case of modification of the routing topology, to broadcast the routing table update messages according to the routing protocol concerned as a priority along best path trees, that is to say, according to the routing topology existing before the modification of the routing topology. Thus, each node of the tree is updated by its parent in the tree existing before the modification of the routing topology. As it happens, its parent in the existing tree may no longer correspond to its parent in the future tree, following the modification of the topology.

Such a method can greatly increase the convergence time of the routing protocol. Furthermore, effectively managing certain routing topology modification situations, such as, notably, the appearance of a new resource in the network, is a complex matter, since there is now no tree for this resource over which to broadcast.

SUMMARY

The present invention aims to improve the situation.

A first aspect of the invention proposes a method of managing a routing topology in a packet communication network comprising a plurality of nodes linked by respective links according to said routing topology; ordered metrics being respectively associated with the links, each directly interlinking two nodes; said method comprising the following steps on a first node linked by a link to at least one second node, upon detection of a modification of the routing topology:

/a/ determining value of a timer associated with the second node;
/b/ setting said timer; and
/c/ on expiry of said timer, sending a topology update message to the second node;

said timer value being supplied by an increasing function that takes as parameter the metric associated with said link linking the first node to the second node, so that the timer value is all the greater when the metric is great.

The expression "routine topology" should be understood here to mean all the links that directly interlink two nodes of the network, that is to say, without any other intermediate node, and that are selected according to packet routing performance criteria within the transmission network. Thus, the implementation of a routing protocol within a transmission network makes it possible to determine "best paths" to reach a given resource from a given node. These best paths are relative to a node and to a resource and possibly consist of several successive links for routing the packets optimally from node to node. Once these best paths are obtained and the routing protocol has converged, the set of links represents the routing topology.

The term "node" should be understood to mean any network entity on which a routing protocol can be implemented, such as, for example, a router within an autonomous system (AS) or else an AS, as defined in the document RFC 4271 (RFC standing for "Request for Comments").

The present invention applies to all the networks based on such protocols. It can be implemented in unified networks and in networks comprising a number of administrative domains, or ASs. It can be applied in networks interconnected to an internet-type network, or even in networks used for private purposes.

The invention covers a configuration in which all the routers of the network advantageously implement a method according to one embodiment of the invention. However, a configuration in which one of the routers implements or only some of the routers of the network implement one embodiment of the invention is already very advantageous.

By virtue of the arrangements as stated in this management method, provision is made to determine a timer value by using an increasing function of the metrics, that is to say, a function which takes as parameter a metric and that supplies a timer value that is all the greater when the metric is great: the greater the metric associated with the link between the first and second nodes, the higher the timer value used to delay sending of the update message. By proceeding in this way, advantageously, the routing topology can converge rapidly toward a final state following a modification of the topology, such as, notably, the deletion of a node or the addition of a node, or even the loss of a link of the topology, for example, in the event of failure.

In practice, according to one management method in one embodiment of the present invention, the moment at which a topology change update message is sent is advantageously determined according to the metric associated with the link between two neighboring nodes. By proceeding in this way, it is possible to schedule in time the sending of the routing path update messages so that the messages are broadcast as a priority in relation to the best paths. In other words, by referring to a representation of the best paths according to a tree structure for a given resource Ri to be reached, similar to the illustration of FIG. 2, the implementation of such a management method makes it possible to prioritize the broadcasting of update messages along the tree of shorter paths relating to the resource Ri. Applying a timer whose timer value is as great as the metric, or performance indicator, associated with the link over which the topology update message will be sent, makes it possible to optimally schedule the sending of these update messages, and thereby notably avoid having a router receive such update messages in the reverse order of its preferences.

Preferably, in addition to a rapid routing protocol convergence, such an implementation also makes it possible to limit the number of messages transmitted in the network following a modification of the routing topology. This allows for a reduction of the workload of the elements in terms of memory occupancy and CPU load.

These characteristics are all the more advantageous when the number of best paths to be updated is large, as may be the case in the event of a failure.

It should also be noted that the slower that a path is updated within the routing topology, the greater the probability becomes that routing loops and black holes will occur. In this case, a large quantity of data passing over these paths during the updates may be lost, which may necessitate their retransmission and therefore affect the overall performance levels of the network.

According to the document "Differentiated BGP update processing for improved routing convergence", each node is updated by its parent in the existing tree which is not necessarily its parent in the new tree currently being determined. Consequently, such a method may induce delays in searching for best paths during the convergence period, and notably, when a new resource appears in the network, it cannot be processed effectively, since there is not yet any best path tree for this resource over which to broadcast. Furthermore, according to the teaching of this document, the timer values are determined on the basis of heuristic methods. Because of this, the application of such timers does not guarantee that the implementation of the routing protocol will be efficient, unlike the application of timers according to one embodiment of the present invention which is based on metrics associated with the links of the routing topology. According to one embodiment of the invention, the update messages are thus propagated all the faster when they follow the future best path tree.

Advantageously, provision is made here to thus apply a timer whose value is determined according to a metric associated with the link linking the node in charge of sending a topology update message, that is to say, the first node, with the node to be informed, that is to say the second node.

One embodiment of the present invention may advantageously be applied to any routing protocol which may be in conformity with a mathematical modeling which is described in subsequent sections. One embodiment of the invention is based on a BGP-type routing protocol. However, there is no limitation as to the type of routing protocol used.

In practice, it can notably be easily applied to a link state protocol, such as an IS-IS (intermediate system to intermediate system) type protocol as defined in RFC 1195 or else an OSPF (open shortest path first) type protocol as defined in RFC 2328.

It should be noted that, for example, to apply a management method according to one embodiment of the present invention to an IS-IS-type protocol, provision is made for an application of the timer, not to delay the sending of the update message concerned as in the context of the BGP protocol, but to delay the updating of the routing table of the node that is learning a new best path. Thus, provision is made in this context to delay the insertion of the new determined best path, with the value of the timer determined according to one embodiment of the invention. By proceeding in this way, it is possible to limit the formation of routing loops which may occur in the context of the use of link state routing protocols. Because of this, the packet losses in such transmission networks are thus reduced.

Thus, in the case of an implementation within a network applying a link state routing protocol, at the step /c/, on expiry of the timer, provision is made to update the routing table of the node being considered here.

In one embodiment of the present invention, the first node detects a routing modification upon detection of the loss of a link linking it to another node or upon receipt of a topology update message from another node.

Provision can be made, when the first node detects a routing modification upon receipt of a topology update message from another node, for the increasing function to also take as parameter a metric received in said update message.

Thus, in the context of the BGP routing protocol, the increasing timer function may advantageously take as parameter the metric associated with the link between the first and second nodes, this metric being able to reflect a peering agreement between two ASs if the first and second nodes are ASs. This function may also take as parameter the length of the path in the network in terms of number of nodes crossed between the node initiating the received update message and the first node considered here.

Thus, in this case, the timer value is determined on the basis of a metric relative to the arc between the first and second nodes, or else relative to the link (which may correspond to the "local pref" BGP attribute on the outgoing arc as defined in the document RFC 4271), and an incoming metric (which may correspond to the "AS PATH" BGP attribute as defined in the document RFC 4271, and also to the "local pref" attribute on the incoming arc).

Provision can be made for the value of a timer to be obtained by the increasing function $\tau_{LP}(s)$ associated with the second node and that satisfies the following equation:

for $i<j, \tau_{LP}(s)=+\infty$ for $i \geq j, \tau_{LP}(s)=(i-j) \times T$ in which s is the metric associated with the link linking the first and second nodes corresponding to the pair (i,j); in which i and j represent preference criteria respectively associated with the first and second nodes;
in which ∞ represents the infinite timer value; and
in which T is a positive constant.

In this case, the metric that is taken into account to determine the moment at which the routing topology update message is sent is linked to preference criteria. Such preference criteria may reflect the terms of an interconnection agreement between network operators and thus indicate the routing preferences attached thereto. In the context of a network comprising a plurality of BGP-type ASs, i and j may advantageously correspond to the pair of BGP community values that reflect an interconnection agreement between ASs, as is defined in the document RFC 1997.

Provision can also be made to take account of a metric relating to the path from a node initiating the update message to the second node. Thus, when the first node detects a routing modification upon receipt of a topology update message from another node, provision can be made for the value to be obtained by application of the increasing function $\tau_{BGP}(s,s')$ associated with the second node satisfying the following equation:

$\tau_{BGP}(s,s') \mapsto T \tau_{LP}(s) + T' \tau_{AP}(s')$ in which the increasing timer function $\tau_{LP}(s)$ is such that for $i<j, \tau_{LP}(s)=+\infty$ for $i \geq j, \tau_{LP}(s)=(i-j) \times T$ in which s is a metric associated with the link linking the first and second nodes and corresponds to the pair (i,j), s comprising a part configured on the first node and a part received in the update message;
in which ∞ represents the infinity timer value;
in which T is a positive constant;
in which $\tau_{AP}$, is such that:

$\tau_{AP}(s')=T' \cdot |s'|$ in which s' is another metric associated with the link linking the first and second nodes, comprising a part configured on the first node and a part received in the update message, and representing a distance between nodes;
in which T' is a positive constant.

This metric associated with the path may correspond, in the context of a BGP-type protocol, to the "AS path" attribute.

A second aspect of the invention proposes a network node comprising means suitable for implementing the steps of the management method according to the first aspect of the present invention.

A third aspect of the invention proposes a routing system comprising a plurality of nodes according to the second aspect of the present invention.

A fourth aspect of the invention proposes a computer program comprising instructions for implementing the method according to the first aspect of the present invention, when this program is run by a processor.

A fifth aspect of the invention proposes a storage medium on which is stored the computer program according to the fourth aspect of the present invention.

Other aspects, aims and advantages of the invention will become apparent from reading the description of one of its embodiments.

BRIEF DESCRIPTION OF THE DRAWINGS

The invention will also be better understood from the drawings, in which:

FIG. 3 illustrates the main steps of a method of managing a routing protocol according to one embodiment of the present invention.

DESCRIPTION OF PREFERRED EMBODIMENTS

Figure 1:
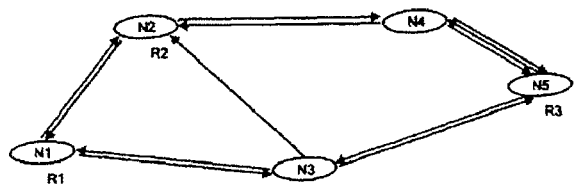
FIG. 1 illustrates a routing topology of a network of routers according to a prior art.
Figure 2:
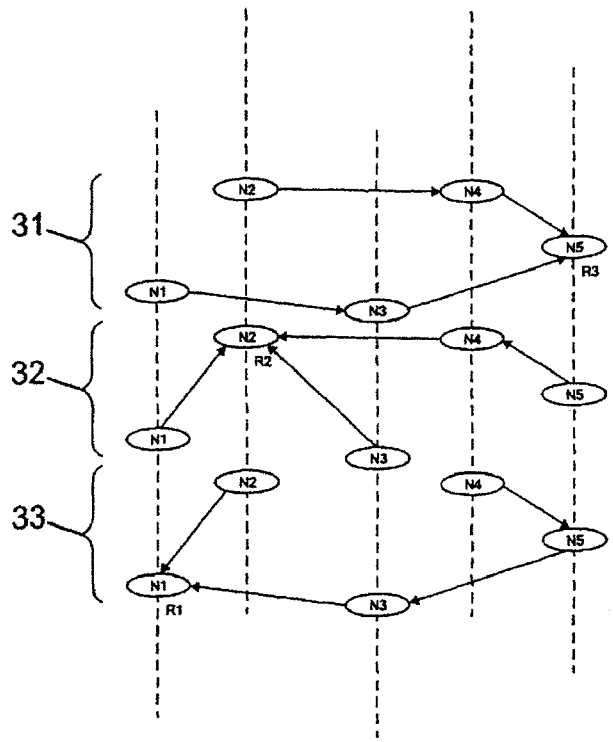
FIG. 2 illustrates a tree representation of paths of the topology illustrated in FIG. 1.
Figure 3:
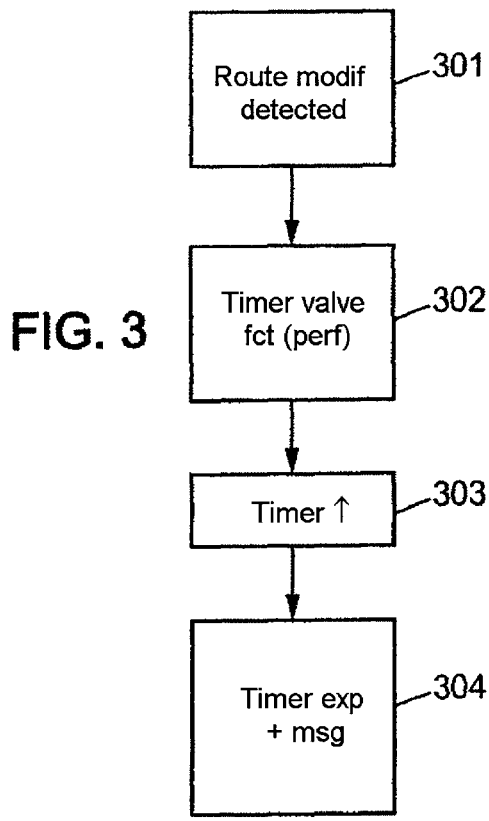
FIG. 3 illustrates the main steps of a method of managing a routing topology according to one embodiment of the invention.

In a packet communication network comprising a plurality of nodes linked by respective links according to the routing topology, a metric is associated with each link directly interlinking two nodes. In a step 301, a modification of the routing topology, on a first node which is linked by a link to at least one second node, is detected.

Then, in a step 302, the value of a timer associated with the second node is determined. The timer value is determined according to the metric associated with the link linking the first node to the second node, by application of an increasing function.

Then, in a step 303, the timer is set with the value determined in the step 302. In a step 304, the timer expires, and a topology update message is sent to the second node.

In the case of an implementation within a network applying a link state routing protocol, in step 304, on expiry of the timer, provision is made to update the routing table of the node concerned here.

Hereinbelow, $(H,S,\prec,\oplus)$ is used to denote a half-ring of endomorphisms describing a routing algebra in a graph $G(V, E)$, in which V designates all the nodes of the graph, or else all the routers implementing one and the same routing protocol;

in which E designates all the links of the graph, or even routing topology;

in which S designates the space of the metrics, or performance indicators;

in which H is all the concatenation functions of S;

in which $\prec$ designates the decision process used to schedule the metrics of S, and $\oplus$ designates the composition operator for the routing policies of H.

For simplicity, the transmission time of a message within a network, that is to say, the delays generated by the transmission of the information along a communication medium (air, copper pair, for optical fiber, etc.) and the delays due to the processing by the elements (time spent in queues, processing times, etc.), is considered negligible compared to a timer value as determined according to one embodiment of the present invention.

However, the implementation of an embodiment of the present invention is in no way limited to this consideration. In practice, for each protocol and each transmission network concerned, provision can be made to obtain times of an order of magnitude that is sufficiently great relative to the transmission time for the latter to be able to be considered negligible.

The following sections explain the system of equations used to determine timer values according to one embodiment of the present invention.

T is used to denote the set defined by the functions $\tau$:

$$\tau:S \rightarrow R^+ \cup \{+\infty\}$$

T is a set of increasing timer functions to be applied to each arc (u,v) of a graph $G(V,E)$. This type of timer function provides a timer value or even a time period during which the routing update message is retained in one embodiment.

Such a timer value is in this case adapted to advantageously take account of the metric associated with the arc (u,v). This function is increasing, so that the greater the associated metric becomes, the longer the update message to be sent will be delayed. Thus, advantageously, the timers used in one embodiment of the invention are not static, nor predetermined and they may delay a routing update message differently according to the metric associated with the path concerned.

The following notations are used:

$0_T \in T$ for the timer function which always provides the zero value, and $\infty_T \in T$ for the timer function which always provides the infinity value.

Let + be the operator defined by the following relation:

$$\forall \tau,\tau',\tau'' \in T, \tau'' = \tau + \tau' \Leftrightarrow \forall s \in S, \tau''(s) = \tau(s) + \tau'(s)$$

A search is now made to determine a timer $\tau_{uv}$, from the concatenation function of the set H, denoted $h_{uv}$ for an arc (u,v).

The following notation is used:

$\Delta_t:H \rightarrow T$, for the transformation which provides a timer value from a concatenation function.

The following relation is satisfied:

$$\Delta_t(H) \subseteq T$$

As a reminder, $(H,S,\prec,\oplus)$ is the half-ring of endomorphisms describing a routing algebra in a graph $G(V,E)$. Each node installs a timer for each incoming arc and a timer for each outgoing arc of a graph, in accordance with its routing policy and in accordance with one and the same transformation $\Delta_t$. In other words, a router defines timers according to one embodiment of the present invention by basing itself on its own routing policy, in input and in output modes, and on the metric associated with this path.

The transformation $\Delta_t$ is designed to determine timers according to one embodiment of the present invention if, and only if, it satisfies the following properties:

a summability property:

$$\Delta_t(h \oplus h') = \Delta_t(h) + \Delta_t(h'); \text{ and}$$

a strict increase property:

$$h \prec_H h' \Rightarrow \Delta_t(h) \prec_T \Delta_t(h').$$

Such a system of equations makes it possible to determine the transformation $\Delta_t$ which satisfies all the following propositions:

proposition 1: the routing messages reach a given router according to its own order of preference, this router then advantageously being able to converge directly toward its final routing table;

proposition 2: the propagation time of a message is equal to the sum of the propagation times required to cross each arc along the path concerned;

proposition 3: a router determines timer values according to one embodiment of the present invention on the basis of its routing policy and of the metric associated with the link concerned.

It should be noted here that the application of such timers is advantageous even if only some of the routers of the network implement these effective timers. Thus, it can advantageously be envisaged to implement one embodiment of the present invention only for a group of operators wishing to offer a service requiring a certain degree of quality.

Figure 4:
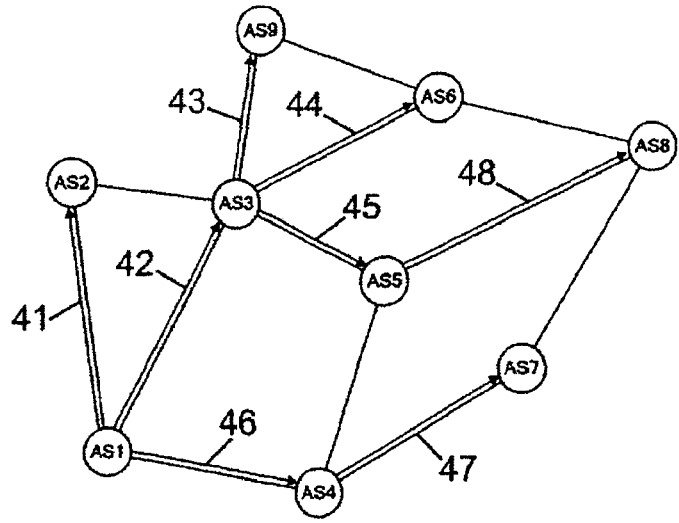
FIGS. 4 and 5 illustrate the management of a failure in a packet communication network according to another embodiment of the invention.
Figure 5:
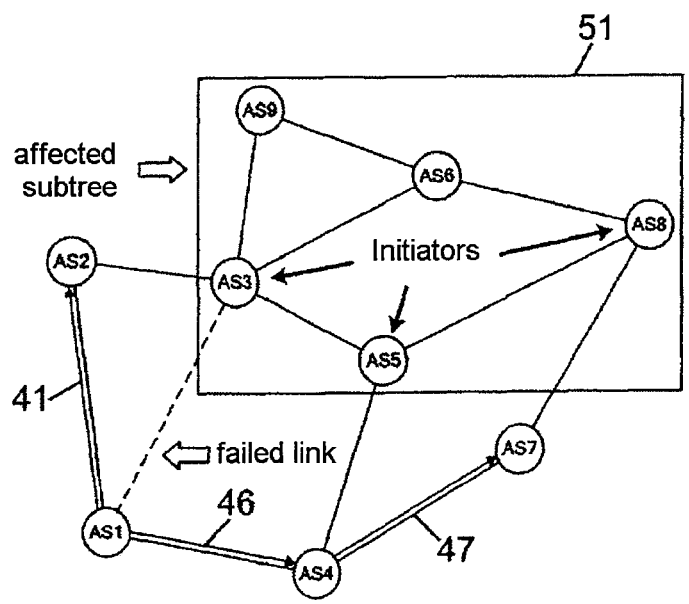

FIGS. 4 and 5 illustrate the management of a failure in a packet transmission network, or packet communication network, according to another embodiment of the invention, applying a BGP-type routing protocol.

FIG. 4 illustrates the implementation of an embodiment in a network comprising nine different autonomous systems or ASs, the best paths here corresponding to the shortest paths in terms of number of hops.

The shortest paths established in convergence to contact AS1 are represented by the arrowed lines 41 to 48. In the case considered here, the link 42 between AS1 and AS3 fails. This situation is illustrated in FIG. 5.

As illustrated in FIG. 5, following the failure of this link 42, the path used by one of the nodes AS3, AS5, AS6, AS8 and AS9, belonging to the subtree 51 rooted at AS3 is no longer available. These nodes AS3, AS5, AS6, AS8 and AS9 are now orphan nodes with respect to the shortest paths for contacting AS1.

In this subtree 51, the nodes AS6 and AS9 no longer have any path for contacting AS1, following the failure. They are therefore waiting for one of their neighboring nodes to announce a new path to them.

The nodes AS3, AS5 and AS8 of the subtree 51 still know at least one valid backup path for contacting the destination AS1, the valid backup paths not being paths of the routing topology because they were not considered as best paths before the failure. Thus, the orphan nodes AS3, AS5 and AS8 can elect from the backup paths the one that corresponds to the new best path, and announce it to their neighboring nodes. These orphan nodes AS3, AS5 and AS8 are initiating nodes because they can therefore initiate the reconstruction of the tree of shortest paths starting from AS1 after a failure.

In the case where a management method according to one embodiment of the present invention is not applied, each orphan node may explore all the possible paths toward the destination AS1 in the reverse order of its preferences before once again converging on its new best path.

In one embodiment of the present invention, the construction is initiated in an ordered manner by imposing on each of the initiating nodes a waiting time before beginning to announce its new best path. Thus, each initiating node begins the construction of its tree of shortest paths with a suitable shift relative to the others. The initiating nodes delay the sending of the update message all the longer when the metric associated with the arc over which this message must be sent is large.

The following sections describe an application of the present invention to the BGP routing protocol. In the context of the BGP protocol, the scheduling of the paths can be done by successive comparison of the attributes attached to the paths. Solely in the interests of simplicity, the description hereinafter will be limited to the first two attributes, "local pref" and "AS path", as defined in document RFC 1997.

Provision can be made for each AS to obey economic constraints such that an AS preferentially involves its clients (high "local pref"), or else its pairs, that is to say nodes with which it has a peering agreement ("peers") (intermediate "local pref"), or else by its suppliers (low "local pref"). "cf2" denotes a client-supplier agreement, "peer" an agreement between peers and "f2c" a supplier-client agreement. A peering agreement may be of the SKA (sender keep all) type.

It is assumed that each AS fairly prioritizes its suppliers, respectively its peers, respectively its clients.

An algebraic modeling of such a context is in this case based on an association of a numeric value, or weighting, Ti with each agreement. In other words, a series of decreasing values (T1,T2,T3) satisfying: for any i, Ti−Ti+1=T; in which T is a strictly positive constant.

The sign "*" signifies "0 or n", the sign "?" signifies 0 or 1, and the sign "+" signifies "1 to n".

Thus, if the path is of the form:
(c2f)*, the message is received at the end of T3 time unit (case where the new best path is learned by a client, or a chain of n client-suppliers, that is to say 0 or n agreements cf2);
(c2f)*(peer), a message is received at the end of T2 time unit (case where the new best path is learned by a peer, or a chain ending with a peering agreement, possibly preceded by a client-supplier chain);
(c2f)*(peer)?(f2c)+, a message is received at the end of T1 time units (case where the new best path is learned by one or n supplier(s), possibly preceded by one peer or no peers, possibly preceded by a client-supplier chain).

The timer functions according to one embodiment of the present invention may take the form:

$$\text{for } i < j, \tau(s) = +\infty$$

$$\text{for } i \geq j, \tau(s) = T_j - \sum_{k=i}^{j}(T_i)$$

or even $$\text{for } i \geq j, \tau(s) = (i-j)xT$$

in which s=i−j; in which i and j represent preference criteria respectively associated with the first and second nodes; and in which T is a strictly positive constant.

By taking, for example, T1=2, T2=1 and T3=0, the following are obtained:

$$\tau_{c2f,c2f} = \tau_{peer,peer} = \tau_{f2c,f2c} = 0 \text{ time unit}$$

$$\tau_{c2f,peer} = \tau_{peer,c2f} = 1 \text{ time unit}$$

$$\tau_{c2f,f2c} = 2 \text{ time units.}$$

Thus, if a node is reachable via a path (c2f)*, that node receives a topology update message after 0 time units. In the case where it is reachable via a path (c2f)*(peer), it receives the topology update message at the end of one time unit. Finally, in the case where it is reachable via a path (c2f)*(peer)?(f2c)+, it receives the topology update message at the end of two time units.

In one embodiment of the present invention, each router at the edge of the AS applies the following principle:
when a router learns a route originating from another AS, it tags it with a value, called BGP community as defined in the document RFC1997, and denoted i indicating the type of agreement installed on the corresponding "incoming" link, that is to say, between the AS from which the received update message originates and the present AS;
when a router sends a route to another AS, it tags it with a BGP community j indicating the type of agreement installed on the corresponding "outgoing" link.

These communities can be used, for example, to associate all the clients with the value 3, all the "peers" with the value 2, and all the suppliers with the value 1. Then, according to the community pair (i,j), the router delays this message in accordance with the following timers:

$$\tau_{c2f,c2f}, \tau_{peer,peer}, \tau_{f2c,f2c}, \tau_{c2f,peer}, \tau_{peer,f2c}$$

(P,min(|·|, ·) denotes the algebra of the paths,
in which P designates the routing topology, or else all the paths of a graph, in which |·| represents the length of the path in terms of number of hops, and · the concatenation operator of the paths.

Thus, the following relation is satisfied in this algebra:

$$(a,b,c,d)\cdot(e,f)=(a,b,c,d,e,f)).$$

The timer functions $\tau_{AP}$ can here be expressed in the form:

$$\tau_{AP}(s')=T'\cdot|s'|$$

in which T' is a strictly positive constant, and in which s' is another metric associated with the link linking the first and second nodes, comprising a part configured on the first node and a part received in the update message, and representing a distance between nodes.

For example, in the context of the BGP routing protocol, this metric may correspond either to the number of ASs added following the AS path as defined in BGP, or to the number of ASs separating the node initiating the updating of the routing topology from the destination resource.

In other words, when a router of the AS edge sends a topology update message to another AS, it delays this message by a timer of value T'·|s'| time units.

A timer function can be expressed in the following form, when the value of T' is small compared to T:

$$(s,s')\mapsto T\tau_{LP}(s)+T'\cdot\tau_{AP}(s')$$

in which s represents the pair of agreements installed on the incoming and outgoing BGP links;

in which s' is as defined above, and may, for example, correspond to the number of ASs added following the AS path as defined hereinabove concerning the outgoing routing protocol session; and in which T and T' are strictly positive constants.

These timer functions make it possible to determine timer values by taking account both of the values representing preference criteria associated with each of the nodes i and j, and values s' that may indicate a metric in relation to a distance between two nodes.

Figure 6:
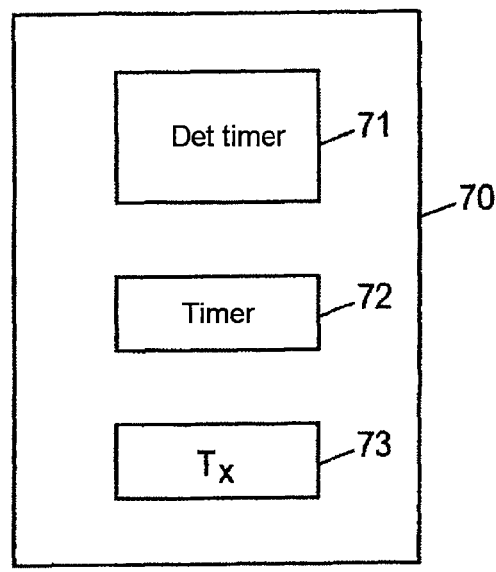
FIG. 6 illustrates a network node according to one embodiment of the present invention.

FIG. 6 illustrates a network node according to one embodiment of the present invention.

Such a network node 70 comprises a unit 71 for determining a value of a timer associated with another node to which it is linked by a link of the routing topology, said timer value being determined on the basis of an increasing function taking as parameter the metric associated with said link linking the first node to the second node so that the timer value is all the greater when the metric is great.

It also comprises a management unit for said timer 72 and a sending unit 73 designed to send, on expiry of said timer, a topology update message to said other node.

The determination unit 71 may be adapted to determine the value of a timer from the following function $\tau_{LP}$ associated with the other node according to the following equation:

$$\text{for } i<j, \tau_{LP}(s)=+\infty$$

$$\text{for } i\geq j, \tau_{LP}(s)=(i-j)\times T$$

in which s is the metric associated with the link linking the first and second nodes and corresponds to the pair (i,j); in which i and j represent preference criteria respectively associated with the first and second nodes;

in which ∞ represents the infinite timer value; and in which T is a positive constant.

The determination unit 71 may be adapted to determine the value of a timer when the first node detects a routing modification upon receipt of a topology update message from another node, the value of a timer derived from the increasing function $\tau_{BGP}$ associated with the second node satisfies the following equation:

$$\tau_{BGP}(s,s')\mapsto T\tau_{LP}(s)+T'\cdot\tau_{AP}(s')$$

in which $\tau_{LP}$ is such that $$\forall i<j, \tau_{LP}(s)=+\infty$$

$$\forall i\geq j, \tau_{LP}(s)=(i-j)\times T$$

in which s is a metric associated with the link linking the first and second nodes and corresponds to the pair (i,j), s comprising a part configured on the first node and a part received in the update message;

in which i and j represent preference criteria respectively associated with the first and second nodes;

in which ∞ represents the infinite timer value; and in which T is a positive constant in which $\tau_{AP}$, is such that:

$$\tau_{AP}(s')=T'\cdot|s'|$$

in which s' is another metric associated with the link linking the first and second nodes, comprising a part configured on the first node and a part received in the update message, and representing a distance between nodes;

in which T' is a positive constant.

The invention claimed is:

1. A method of managing a routing topology in a packet communication network comprising a plurality of nodes including a first node and a second node linked by a link, the method being carried out by the first node, the method comprising, upon detection of a modification of the routing topology:
   determining value of a timer associated with the second node;
   setting said timer; and
   on expiration of said timer, sending a topology update message to the second node;
   supplying said timer value by an increasing function that takes as a parameter a value that is based on an AS PATH parameter associated with said link, so that the timer value is larger when the value that is based on the AS PATH parameter is larger.

2. The method of claim 1, wherein the first node detects the routing topology modification upon detection of the loss of a link linking it to another node or upon receipt of a topology update message from another node.

3. The method of claim 1, wherein, when the first node detects a routing modification upon receipt of a topology update message from another node, the increasing function also takes as a parameter another value, received in said update message, that is based on an AS PATH parameter.

4. The method of claim 1, wherein the value of a timer is supplied by a function $\tau_{LP}(S)$ associated with the second node that satisfies the following equation:

$$\forall i<j, \tau_{LP}(s)=+\infty$$

$$\forall i\geq j, \tau_{LP}(s)=(i-j)\times T$$

wherein
   s is the value that is based on the AS PATH parameter and corresponds to the pair (i,j),
   i and j represent preference criteria respectively associated with the first and second nodes,
   ∞ represents the infinite timer value, and
   T is a positive constant.

5. The method of claim 1, wherein, when the first node detects a routing modification upon receipt of a topology update message from another node, the value of a timer is supplied by a function $\tau_{BGP}(s,s')$ associated with the second node that satisfies the following equation:

$$\tau_{BGP}(s,s') \mapsto T \cdot \tau_{LP}(s) + T' \cdot \tau_{AP}(s')$$

wherein $\tau_{LP}$ is such that $$\forall i < j, \tau_{LP}(s) = +\infty$$

$$\forall i \geq j, \tau_{LP}(s) = (i-j) \times T$$

s is value that is based on the AS PATH parameter and corresponds to the pair (i,j), s comprising a part configured on the first node and a part received in the update message, i and j represent preference criteria respectively associated with the first and second nodes, ∞ represents the infinite timer value, T is a positive constant, and $\tau_{AP}$ is such that:

$$\tau_{AP}(s') = T \cdot |s'|$$

wherein s' comprises a part configured on the first node and a part received in the update message, representing a distance between nodes, and T' is a positive constant.

6. A non-transitory computer readable medium having instructions recorded thereon, the instructions configured for implementing the method as claimed in claim 1, when the instructions are executed by a processor.

7. The method of claim 1, wherein the AS PATH parameter identifies the autonomous systems between the first node and the second node.

8. The method of claim 1, wherein the value is the number of autonomous systems separating the first node and the second node on the link.

9. A network node in a packet communication network comprising a plurality of nodes linked by respective links according to a routing topology, said node comprising:

a unit for determining a value of a timer associated with another node to which it is linked by a link of the routing topology, said timer value being supplied by an increasing function that takes as a parameter a value that is based on an AS PATH parameter associated with said link such that the timer value is larger when the value that is based on the AS PATH parameter is larger;

a unit for managing said timer; and a sending unit that sends, on expiration of said timer, a topology update message to said other node.

10. The network node as claimed in claim 9, wherein the determination unit determines the value of a timer by a function $\tau_{LP}(s)$ associated with the second node that satisfies the following equation:

$$\forall i < j, \tau_{LP}(s) = +\infty$$

$$\forall i \geq j, \tau_{LP}(s) = (i-j) \times T$$

wherein s is the value that is based on the AS PATH parameter and corresponds to the pair (i,j), i and j represent preference criteria respectively associated with the first and second nodes, ∞ represents the infinite timer value, and T is a positive constant.

11. The network node as claimed in claim 9, wherein the determination unit determines, when the first node detects a routing modification upon receipt of a topology update message from another node, the value of a timer by a function $\tau_{BGP}(s,s')$ associated with the second node that satisfies the following equation:

$$\tau_{BGP}(s,s') \mapsto T \cdot \tau_{LP}(s) + T' \cdot \tau_{AP}(s')$$

wherein $\tau_{LP}$ is such that $$\forall i < j, \tau_{LP}(s) = +\infty$$

$$\forall i \geq j, \tau_{LP}(s) = (i-j) \times T$$

wherein s is the value that is based on the AS PATH parameter and corresponds to the pair (i,j), s comprising a part configured on the first node and a part received in the update message, i and j represent preference criteria respectively associated with the first and second nodes, ∞ represents the infinite timer value, T is a positive constant, and $\tau_{AP}$ is such that:

$$\tau_{AP}(s') = T \cdot |s'|$$

wherein s' comprises a part configured on the first node and a part received in the update message, and representing a distance between nodes, and T' is a positive constant.

12. The network node of claim 9, wherein the value is the number of autonomous systems added to the link between the first node and the second node.

13. The network node of claim 9, wherein the AS PATH parameter identifies the autonomous systems between the first node and the second node.

14. The network node of claim 9, wherein the value is the number of autonomous systems separating the first node and the second node on the link.

15. The network node of claim 9, wherein the value is the number of autonomous systems added to the link between the first node and the second node.

16. A method of managing a routing topology in a packet communication network comprising a plurality of nodes including a first node and a second node linked by a link the method comprising:

upon detection of a modification of the routing topology:
determining value of a timer associated with the second node,
setting said timer,
on expiration of said timer, sending a topology update message to the second node; and supplying said timer value by an increasing function that takes as a parameter the distance between the first node and the second node along the link, so that the timer value is larger when the distance is larger.

* * * * *